United States Patent
Katukam et al.

(10) Patent No.: US 7,616,584 B2
(45) Date of Patent: Nov. 10, 2009

(54) MINIMIZING SINGLE POINTS OF FAILURE IN PATHS WITH MIXED PROTECTION SCHEMES

(75) Inventors: Suresh Katukam, San Jose, CA (US); Pradeep Singh, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 831 days.

(21) Appl. No.: 10/986,675

(22) Filed: Nov. 12, 2004

(65) Prior Publication Data

US 2006/0104199 A1    May 18, 2006

(51) Int. Cl.
*H04L 12/26* (2006.01)

(52) U.S. Cl. ........................................ 370/252; 370/255

(58) Field of Classification Search ............... None
See application file for complete search history.

(56) References Cited

U.S. PATENT DOCUMENTS

| | | | |
|---|---|---|---|
| 5,253,248 A | 10/1993 | Dravida et al. | |
| 5,459,716 A | 10/1995 | Fahim et al. | |
| 5,467,345 A | 11/1995 | Cutler, Jr. et al. | |
| 5,497,368 A | 3/1996 | Reijnierse et al. | |
| 5,627,822 A | 5/1997 | Edmaier et al. | |
| 5,832,196 A | 11/1998 | Croslin et al. | |
| 5,838,660 A | 11/1998 | Croslin | |
| 5,854,899 A | 12/1998 | Callon et al. | |
| 5,883,881 A | 3/1999 | Croslin | |
| 6,026,077 A | 2/2000 | Iwata | |
| 6,073,248 A | 6/2000 | Doshi et al. | |
| 6,078,590 A | 6/2000 | Farinacci et al. | |
| 6,185,210 B1 | 2/2001 | Troxel | |
| 6,337,846 B1 * | 1/2002 | Bengston et al. | 370/216 |
| 6,430,150 B1 | 8/2002 | Azuma et al. | |
| 6,751,190 B1 | 6/2004 | Swallow | |
| 6,765,880 B1 | 7/2004 | Hillard et al. | |
| 2002/0080445 A1 * | 6/2002 | Falkenstein et al. | 359/127 |
| 2004/0151124 A1 * | 8/2004 | Hauser et al. | 370/252 |
| 2005/0055459 A1 * | 3/2005 | Bamba | 709/238 |
| 2005/0185576 A1 * | 8/2005 | Sugawara et al. | 370/216 |

* cited by examiner

*Primary Examiner*—Kevin C Harper
*Assistant Examiner*—Rhonda Murphy
(74) *Attorney, Agent, or Firm*—Cindy Kaplan (57) ABSTRACT

Methods and apparatus for substantially minimizing single points of failure for circuit paths in networks with mixed protection schemes are disclosed. According to one aspect of the present invention, a method for routing circuit paths between a source and a destination of a network includes identifying a first available circuit path between the source and the destination. The first available circuit path includes a first plurality of links which each have an associated protection type. The method also includes determining a number protection changes associated with the first plurality of links, and assigning a first metric to the first available path that is based on the number of protection changes. Finally, the method includes identifying a selected available path to be used to pass information between the source and the destination based at least in part on the first metric.

52 Claims, 8 Drawing Sheets

MINIMIZING SINGLE POINTS OF FAILURE IN PATHS WITH MIXED PROTECTION SCHEMES

BACKGROUND OF THE INVENTION

1. Field of Invention

The present invention relates generally to network systems. More particularly, the present invention relates to enabling a path between a source and a destination to be automatically chosen such that the number of potential single failure points may be minimized.

2. Description of the Related Art

The demand for data communication services is growing at an explosive rate. Much of the increased demand is due to the fact that more residential and business computer users are becoming connected to the Internet. To address the demand for data communication services, the use of optical networks, such as a synchronous digital hierarchy (SDH) network or a synchronous optical network (SONET), is becoming more prevalent. A SONET network is an example of a time division multiplexed (TDM) network. TDM networks generally allocate single lines to be used amongst multiple users, or customers of data communication services. The single lines may each be divided into slots of time during which each user has access to the single lines.

Providers of network services typically aim to provide a large variety of service level agreements to customers in an effort to more effectively meet the needs of the customers. Service level agreements generally provide circuit paths that minimize the use of network resources while meeting the requirements of a service level.

Typically, optical networks provided by service providers include a mix of protection schemes. Within a given network, there is often some combination of 2-fiber bi-directional line switched rings (BLSRs), 4-fiber BLSRs, links with 1+1 protection, and uni-directional path switched rings (UPSRs). A circuit path through a network may include a combination of links with different kinds of protection. In general, any time there is a transition in a circuit path between different protection schemes, the node at which the transition essentially occurs is considered to be a single point of failure.

Many network administrators are turning to the use of automated path computation algorithms to use in determining circuit paths through a network, since the manual routing of circuit paths is often time-consuming and, hence, inefficient. Typical automated algorithms which are used to compute circuit paths through a network are based on shortest path first logic. In other words, a best path through a network is often considered to be the path with the least number of hops, or the path which passes through the fewest number of nodes. To identify the shortest path through a network, many path computation algorithms account for both the number of hops included in the path and the cost of each link included in the path. In other words, the number of hops included in a path and the cost of each link included in the path are routing metrics which are used in the determination of circuit paths through a network.

Figure 1A:
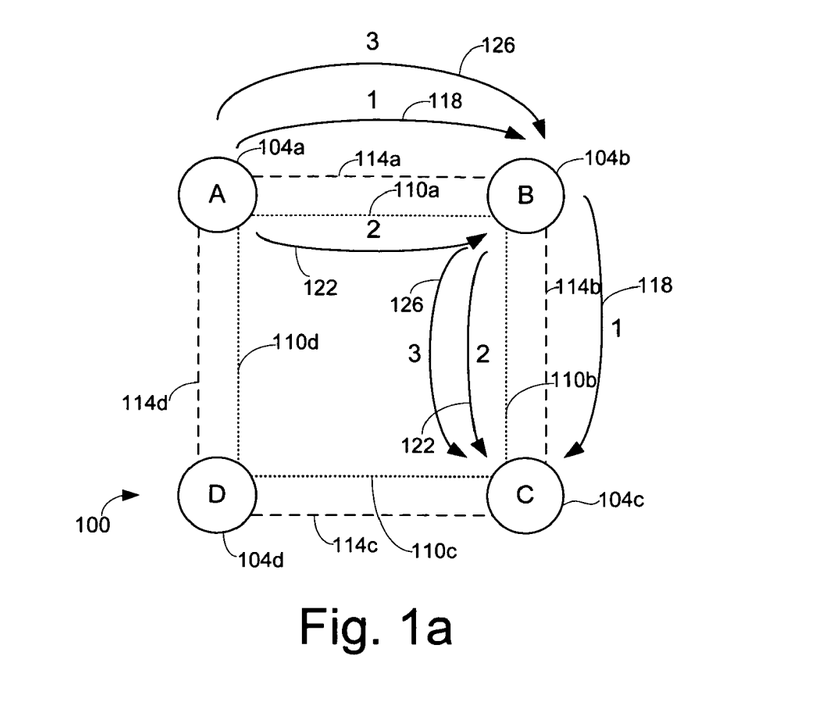
FIG. 1a is a diagrammatic representation of a network in which multiple paths are available between a source node and a destination node.

FIG. 1a is a diagrammatic representation of a network in which multiple paths are available between a source node and a destination node. A network 100 includes nodes 104, which may be routers, servers, or substantially any other network element. Nodes 104 are in communication with one another over links 110 of an inner BLSR ring, e.g., an inner 2-fiber BLSR ring or an inner 4-fiber BLSR ring, and links 114 of an outer BLSR ring, e.g., an outer 2-fiber BLSR ring or an outer 4-fiber BLSR ring. Node 104a is a source node, or a start node, for a circuit path through network 100, while node 104c is a destination node, or an end node, for the circuit path through network 100.

Assuming that a circuit path from node 104a to node 104c is preferably to include intermediate node 104b, then there may be four potential circuit paths. A first path 118 from node 104a to node 104c utilizes link 114a and link 114b of the outer BLSR ring, while a second path 122 from node 104a to node 104c utilizes link 110a and link 110b of the inner BLSR ring. A third path 126 from node 104a to node 104c includes link 114a of the outer BLSR ring and link 110b of the inner BLSR ring. It should be appreciated that a fourth path (not shown) from node 104a to node 104c includes link 110a of the inner BSLR ring and link 114b of the outer BLSR ring. However, since such a path is similar to third path 126 in that it also includes a link from the inner BLSR ring and a link from the outer BLSR ring, such a path has not been shown for ease of illustration.

Each of paths 118, 122, 126 has two hops, and the cost of the links included in each path 118, 122, 126 is substantially the same. Hence, each of paths 118, 122, 126 may be considered to be the shortest path from node 104a to node 104c which includes node 104b.

Figure 1B:
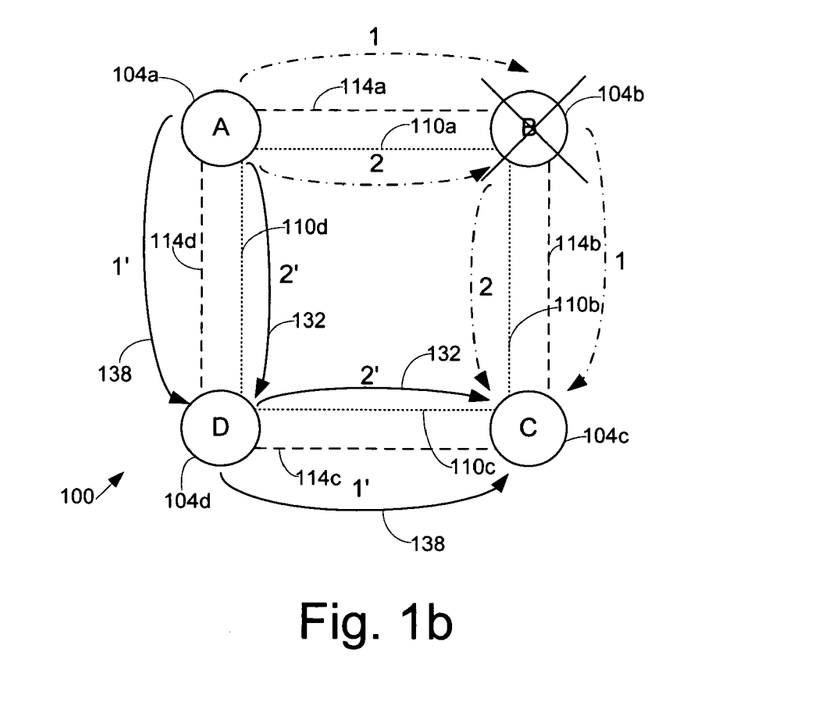
FIG. 1b is a diagrammatic representation of a network, i.e., network 100 of FIG. 1a, in which multiple paths are available between a source node and a destination node but an intermediate node is off-line.

Though paths 118, 122, 126 may each be considered to be the shortest path from node 104a to node 104c, paths 118, 122, 126 have different path protection characteristics. By way of example, if node 104b fails, not all of paths 118, 122, 126 are protected such that a signal may still be routed. With reference to FIG. 1b, the ramifications of the failure of node 104b will be described. When node 104b fails, or is otherwise taken off line, then if a circuit path from node 104a to node 104c which is arranged to pass through node 104b is path-protected, information may continue to be sent from node 104a to node 104c. By way of example, since a first path 118 of FIG. 1a utilizes link 114a and link 114b of an outer BLSR ring, first path 118 is protected by alternate path 138 which includes link 114d and link 114c of the outer BLSR ring. Hence, when node 104b fails, alternate path 138 may be used to send information from node 104a to node 104d in lieu of path 118 of FIG. 1a. Similarly, since a second path 122 of FIG. 1a utilizes link 10a and link 10b of an inner BLSR ring, second path 122 is protected by alternate path 132 which includes link 110d and link 110c.

A third path 126 of FIG. 1a, however, is not path-protected from a failure of node 104b. That is, there is no alternate path which enables signals which are intended to pass on third path 126 of FIG. 1a to be successfully routed from node 104a to node 104c if node 104b fails. Since third path 126 includes link 114a and link 110b, which are parts of different BLSR rings, though third path 126 is line-protected, third path 126 is not protected from a failure of node 104b.

Path computation algorithms generally do not account for the possibility of path-protection, as path-protection is not quantified as a routing metric. As a result, a circuit path which does not have path-protection may be selected as the path to be used between a source and a destination when comparable circuit paths which have path-protection are available. When path-protection is an important consideration, the selection of a shortest path which is not path-protected may have significant consequences when an intermediate node within the shortest path fails.

Figure 2:
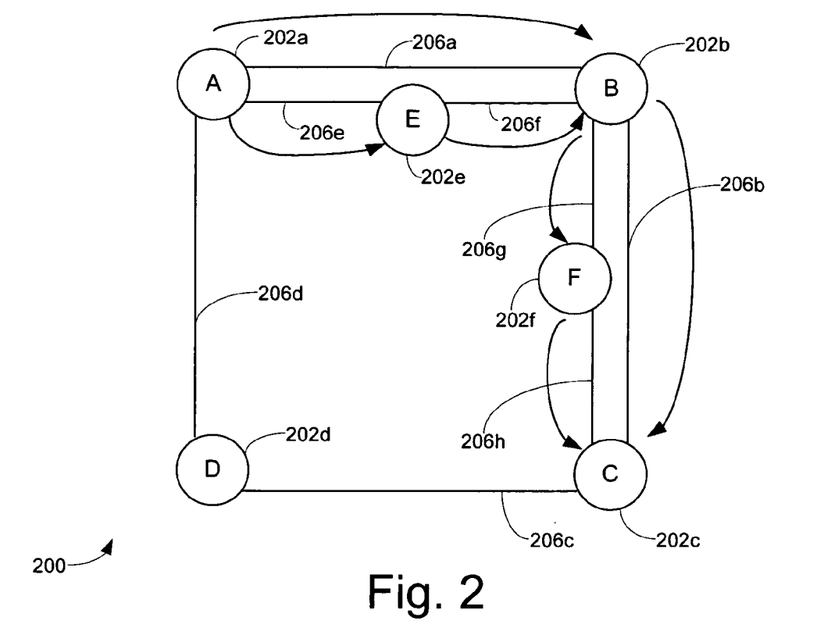
FIG. 2 is a diagrammatic representation of a network in which a shortest available path may not be the most desirable path.

By way of example, FIG. 2 is a diagrammatic representation of a network in which a shortest available path may not be the most desirable path. Within a network 200 that includes nodes 202, the shortest path between source node 202a and destination node 202c includes a link 206a and a link 206b. A path that includes link 206a and link 206b is path-protected by an alternate path that includes link 206d and link 206c. Typically, a path computation algorithm which is arranged to identify a shortest path between source node 202a and destination node 202c will identify the path that includes link 206a and link 206b as the best path, particularly if link 206d and link 206c are identified as having a relatively high cost or if node 202b is desired as an intermediate node if possible.

If link 206b is unavailable, e.g., if link 206b does not have any available bandwidth, and links 206d, 206c are considered to have relatively high costs or if node 202d is desired as an intermediate node if possible, then a path computation algorithm may identify a path which includes link 206a, link 206g, and link 206h as the shortest path between source node 202a and destination node 202c. While a path which includes link 206a, link 206g, and link 206h may be the shortest available path between source node 202a and destination node 202c, such a path is not path-protected. A path which includes links 206e-h is not the shortest available path when link 206b is effectively unavailable, though such a path is path-protected. Since the path which includes links 206e-h is not identified by typical path computation algorithms as the best path between source node 202a and destination node 202c, even if a path with path-protection may be considered to be more important than a shortest path, the path selected by typical path computations algorithms may not be path-protected.

Therefore, what is needed is an automated system which enables path-protection to be considered as a criterion when a path between a source and a destination is to be computed. That is, what is desired is a path computation algorithm which automatically enables path-protection to be used as a routing metric when it comes to the selection of circuit paths through a network.

SUMMARY OF THE INVENTION

The present invention relates to minimizing single points of failure for circuit paths in networks with mixed protection schemes. According to one aspect of the present invention, a method for routing circuit paths between a source and a destination of a network includes identifying a first available circuit path of the circuit paths between the source and the destination. The first available circuit path includes a first plurality of links which each have an associated protection type. The method also includes determining a number of protection changes, e.g., the number of transitions between different protection types and transitions between different rings of 2-fiber bi-directional line switched rings, associated with the first plurality of links, and assigning a first metric to the first available path that is based on the number of protection changes associated with the first plurality of links. Finally, the method includes identifying a selected available path of the circuit paths to be used to pass information between the source and the destination based at least in part on the first metric.

In one embodiment, the method also includes identifying a second available circuit path that has a second plurality of links that each have an associated protection type, determining a number of protection changes associated with the second plurality of links, and assigning a second metric to the second available path that is based on the number of protection changes associated with the second plurality of links. In another embodiment, the different protection types associated with the first plurality of links include any of a 2-fiber bi-directional line switched ring type, a 4-fiber bi-directional line switched ring type, a 1+1 protection type, and a uni-directional path switched ring type.

By effectively quantifying protection as a routing metric for use in automatically computing a circuit path in a network with mixed protection schemes, the number of potential single points of failure associated with the circuit path may effectively be minimized. As a result, a route or a path between a source element and a destination element may be automatically routed to include the fewest number of potential single points of failure of all available routes or paths between the source element and the destination element, even if such a route or path is not the shortest path between the source element and the destination element. When minimizing the single points of failure in a path between a source and a destination is a more important feature of a path than the number of hops or nodes between the source and the destination, a path computation algorithm which allows for a path protection metric enables a path which minimizes the single points of failure to be substantially automatically, and efficiently, routed.

According to another aspect of the present invention, a device that routes circuit paths within a network between a source and a destination includes a path computation element and a path implementation element. The path computation element identifies a selected circuit path of a plurality of available circuit paths between the source and the destination, and determines a number of changes in protection schemes within each of the available circuit paths and to identify the selected circuit path as the available circuit path with the lowest number of changes in the protection schemes. The path implementation element implements the selected circuit path between the source and the destination. In one embodiment, the path computation element also assigns metrics to each of the available circuit paths. The metrics are indicative of the number of changes in the protection schemes within each of the available circuit paths.

According to still another aspect of the present invention, a method for routing circuit paths between a source and a destination of a network includes identifying a plurality of available circuit paths between the source and the destination that are each at least partially protected. The method also includes identifying a first available path which includes the lowest number of potential single points of failure, and selecting that first available path for use in routing information between the source and the destination.

In one embodiment, the method includes assigning protection quality metrics to the available paths. A first protection quality metric of the protection quality metrics is associated with the first available path of the plurality of available paths and identifies a number of potential single points of failure associated with the first available path, while a second protection quality metric of the plurality of protection quality metrics is associated with a second available path of the plurality of available paths and identifies a number of potential single points of failure associated with the second available path. In another embodiment, each available path has the same path length and is considered to be the shortest path between the source and the destination.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Although a shortest path between a source node and a destination node of a network is often the best path between the source node and the destination node, the shortest path may not always provide path protection. For example, while the shortest path between a source node and a destination node may be line-protected, such a path may have at least one single point of failure that prevents the path from being path-protected.

As some customers of service providers may prefer path-protection to a shortest path in service level agreements, the ability to provide an ability to select between path computation based primarily on a shortest path specification and path computation based on a higher level of protection enables customers to more effectively choose paths based on their needs. The addition of protection quality metric as a circuit path characteristic enables a customer to essentially select a path between a source node and a destination node which substantially minimizes single points of failure within a circuit path while substantially ensuring that the circuit path has the best path-protection available between the source node and the destination node.

By associating a cost with path transitions between different protection types and different rings within a network, single points of failure within a circuit path may effectively be minimized. The use of a protection quality metric which is used to associate costs with transitions between protection types and different rings enables path-protection to, in effect, be quantified and used in a path computation algorithm.

A protection quality metric is typically an integer value that is incremented each time there is a switch or a transition from a link of one type of protection to another, or from one ring to another, e.g., from an inner bi-directional line switched ring (BLSR) ring to an outer BLSR ring. Hence, although multiple paths between two points, e.g., a path between a source node and a destination node, may use the same number of links and have the same number of hops, the paths may each have a different protection quality metric. By way of example, if a circuit path originally starts on a BLSR topology, then transitions to either a 1+1 or a uni-directional path switched ring (UPSR), a path computation algorithm that is based on a protection criterion will typically associate a cost with such a transition. In addition, in a path computation algorithm that is based on a protection criterion, a transition from one BLSR ring to another BLSR ring is also considered to be costly.

Figure 3A:
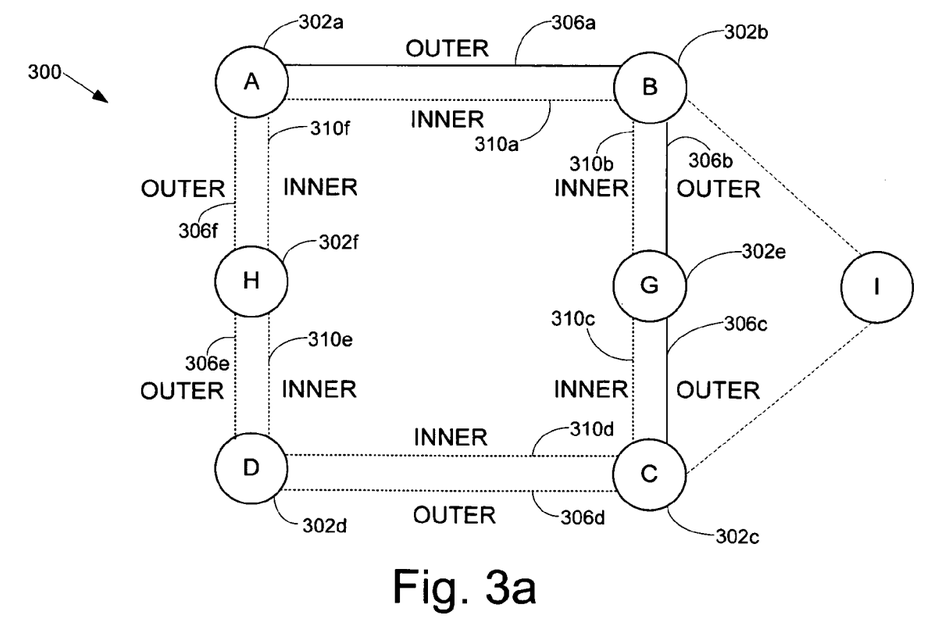
FIG. 3a is a diagrammatic representation of a network in which a circuit path between a source node and a destination node has an associated protection quality metric of zero in accordance with an embodiment of the present invention.

FIG. 3a is a diagrammatic representation of a network in which a circuit path between a source node and a destination node has an associated protection quality metric of zero in accordance with an embodiment of the present invention. Within a network 300, nodes 302 may be in communication with one another over an outer BLSR ring which includes links 306 and an inner BLSR ring which includes links 310. Nodes 302 may be network elements which are associated with a single service provider, or with multiple service providers.

Outer BLSR ring and inner BLSR ring may either be 2-fiber BLSR rings or 4-fiber BLSR rings. A circuit path between a source node 302a and a destination node 302c may generally be chosen to include any of links 306, 310. When the circuit path is chosen to include links 306a-c, the circuit path between source node 302a and destination node 302c has a protection quality metric of zero since each link 306a, link 306b, and link 306c is associated with the same BLSR ring, i.e., an outer BLSR ring. Hence, the circuit path that includes links 306a-c is protected from single points of failure, as for example by an alternate path which includes link 306 306f, link 306e, and link 306d.

Figure 3B:
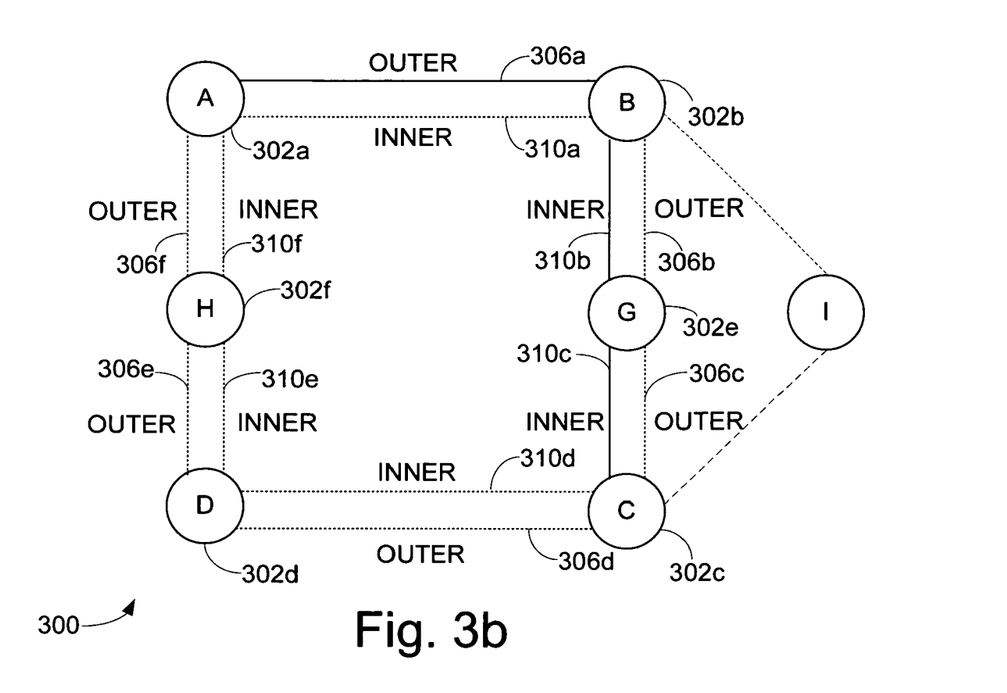
FIG. 3b is a diagrammatic representation of a network, i.e., network 300 of FIG. 3a, in which a circuit path between a source node and a destination node has an associated protection quality metric of one in accordance with an embodiment of the present invention.

With reference to FIG. 3b, an example of a circuit path between source node 302a and destination node 302c of network 300 of FIG. 3a which has a protection quality metric of one will be described in accordance with an embodiment of the present invention. When a circuit path between source node 302a and destination node 302c includes links 306, 310 which are part of an outer ring BLSR ring and an inner BLSR ring, respectively, the protection quality metric will have a non-zero value, since at least one switch between the outer BLSR ring and the inner BLSR ring occurs. A circuit path which includes link 306a from the outer BLSR ring and links 310b, 310c from the inner BLSR ring has a protection quality metric of one, as there is one switch between the outer BLSR ring and the inner BLSR ring. Hence, although the circuit path which includes link 306a, link 310b, and link 310c has the same number of hops as the circuit path of FIG. 3a which includes links 306a-c, the circuit path which includes link 306a, link 310b, and link 310c may be less desirable due to its associated higher protection quality metric.

Figure 3C:
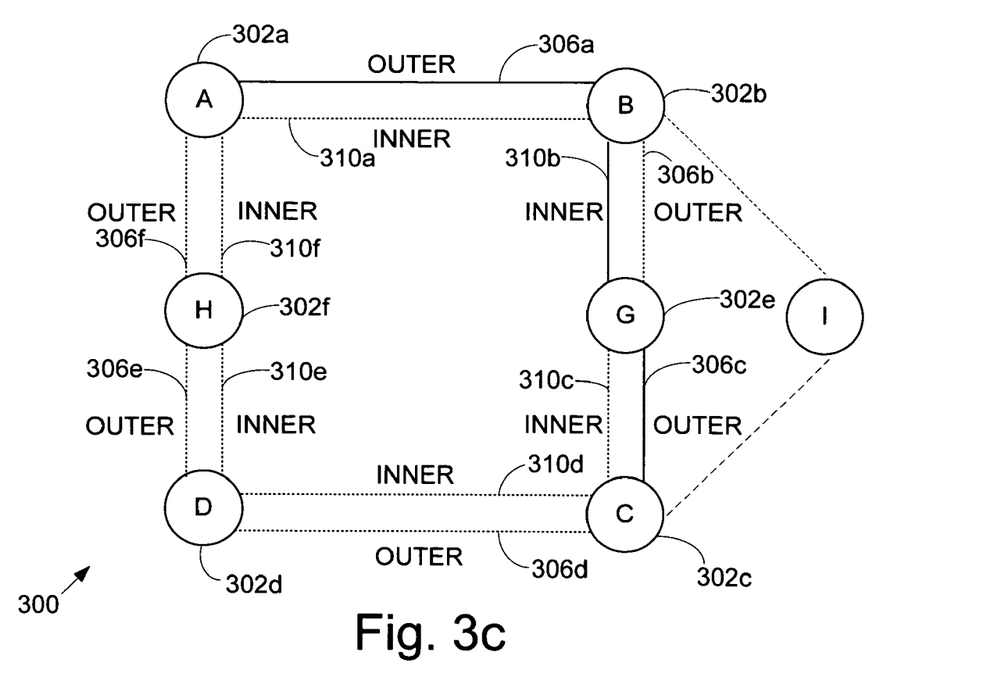
FIG. 3c is a diagrammatic representation of a network, i.e., network 300 of FIG. 3a, in which a circuit path between a source node and a destination node has an associated protection quality metric of two in accordance with an embodiment of the present invention.

FIG. 3c is a diagrammatic representation of a network, i.e., network 300 of FIG. 3a, in which a circuit path between a source node and a destination node has an associated protection quality metric of two in accordance with an embodiment of the present invention. A circuit path between source node 302a and destination node 302c may include link 306a and link 306c from an outer BLSR ring, as well as link 310b from an inner BLSR ring. Since there are two switches, or protection changes, between BLSR rings, i.e., from link 306a of the outer ring to link 310b of the inner ring and from link 310b of the inner ring to link 306c of the outer ring, the protection quality metric of the circuit path is two.

Figure 4:
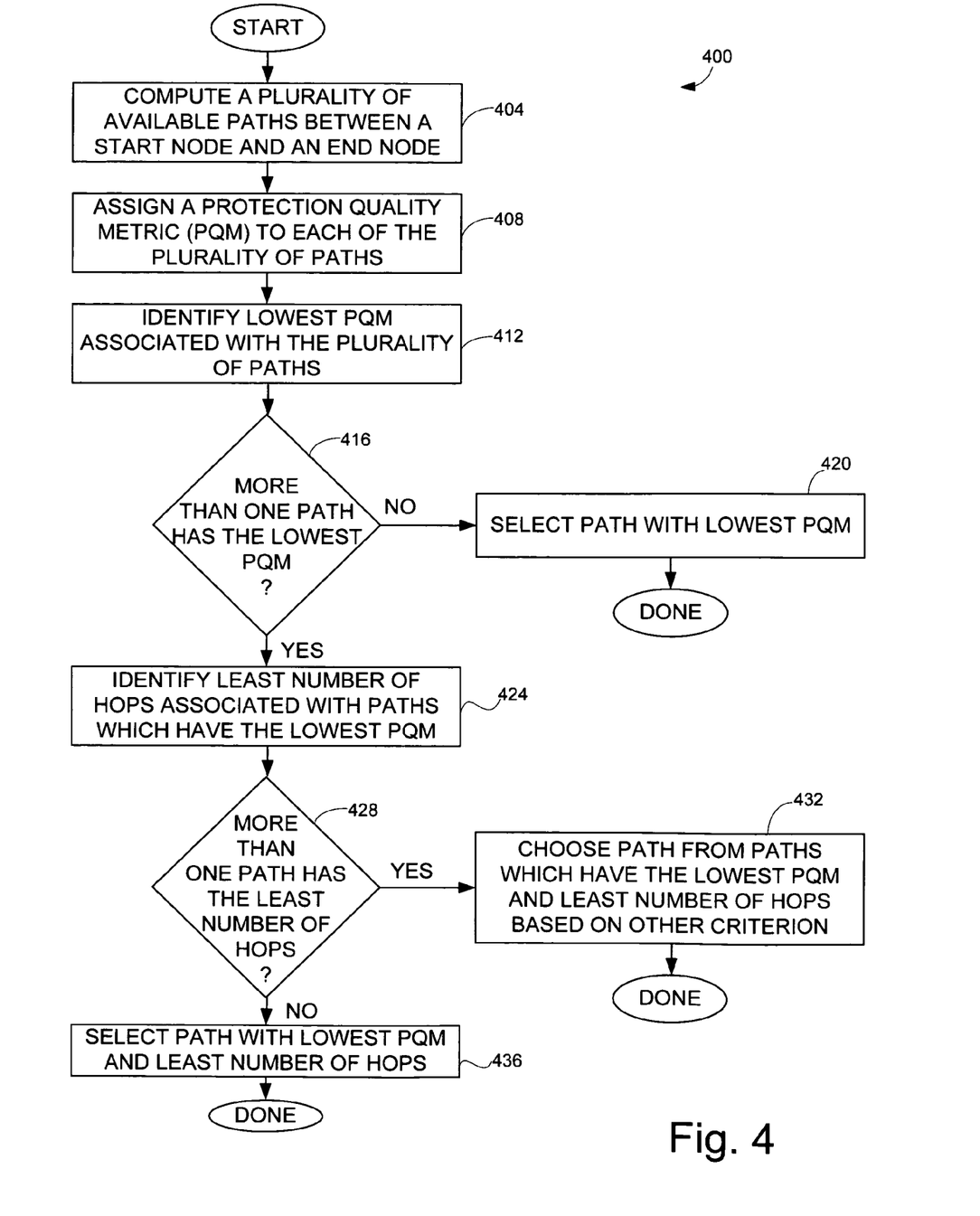
FIG. 4 is a process flow diagram which illustrates one method of identifying a path, e.g., a best path, based on a primary criterion of a low protection quality metric in accordance with an embodiment of the present invention.

Within a path computation algorithm that utilizes a protection quality metric, a user or a service level agreement may select a criterion which is to be used as the primary criterion in selecting a path between a source and a destination. In one embodiment, the criterion may be a low protection quality metric. With reference to FIG. 4, the steps associated with one method of identifying a path, e.g., a best path, based on a primary criterion of a low protection quality metric will be described in accordance with an embodiment of the present invention. A process 400 of identifying a circuit path begins at step 404 in which a plurality of available paths between a start node, i.e., a source, and an end node, i.e., a destination, are computed. The plurality of available paths may generally be computed using substantially any suitable algorithm. Typically, the available paths do not include links which have effectively no available bandwidth. It should be appreciated that although the use of a protection quality metric is typically used in relation to available paths which include protected segments, that use of a protection quality metric may also be implemented for use with substantially any available path.

Once a plurality of available paths is computed, a protection quality metric is assigned to each of the plurality of paths in step 408. As previously mentioned, a protection quality metric for a given path is typically incremented each time there is a change in a ring, e.g., from an inner ring to an outer ring, or a change in a link type, e.g., from a link with 1+1 protection to a 2-fiber BLSR, within the path. Upon assigning a protection quality metric to each of a plurality of paths, the lowest protection quality metric associated with the plurality paths is identified in step 412. That is, the lowest value for a protection quality metric that is assigned to any of the plurality of paths is determined.

A determination is made in step 416 as to whether there is more than one path that has the lowest protection quality metric associated with the plurality of paths. If it is determined that no more than one path has the lowest protection quality metric, then the indication is that there is a single path that has the lowest protection quality metric. Accordingly, in step 420, the path with the lowest protection quality metric is selected for use as the circuit path between the start node and the end node, and the process of selecting a circuit path is completed.

Alternatively, if it is determined in step 416 that more than one path has the lowest protection quality metric, then a secondary criterion may be used to choose between the paths which have the lowest protection quality metric. In the described embodiment, the secondary criterion involves identifying a shortest path, or the path with the least number of hops between nodes. As such, in step 424, the least number of hops associated with paths which have been determined to have the lowest protection quality metric of the plurality of paths is identified.

Following the identification of the least number of hops associated with paths which have been determined to have the lowest protection quality metric, it is determined in step 428 whether more than one path has the least number of hops. If it is determined that more than one path has the least number of hops, then in step 432, a path is selected from the paths which have both the lowest protection quality metric and the least number of hops based on at least another, e.g., tertiary, criterion. Criteria that may be used to choose a path from among the group of paths which have both the lowest protection quality metric and the least number of hops include, but are not limited to, a preferred type of link for a path and preferred nodes through which a path is to pass. Once a path is chosen based on a tertiary criterion, the process of selecting a circuit path is completed.

Returning to step 428, if it is determined that only one path has the least number of hops, then the indication is that one path is relatively clearly the shortest path of all the paths which have the lowest protection quality metric. As such, process flow moves to step 436 in which that path, i.e., the path with the lowest protection quality metric and the least number of hops, is selected, and the process of selecting a circuit path is completed. It should be appreciated that once the path is selected, the path may be implemented.

Figure 5:
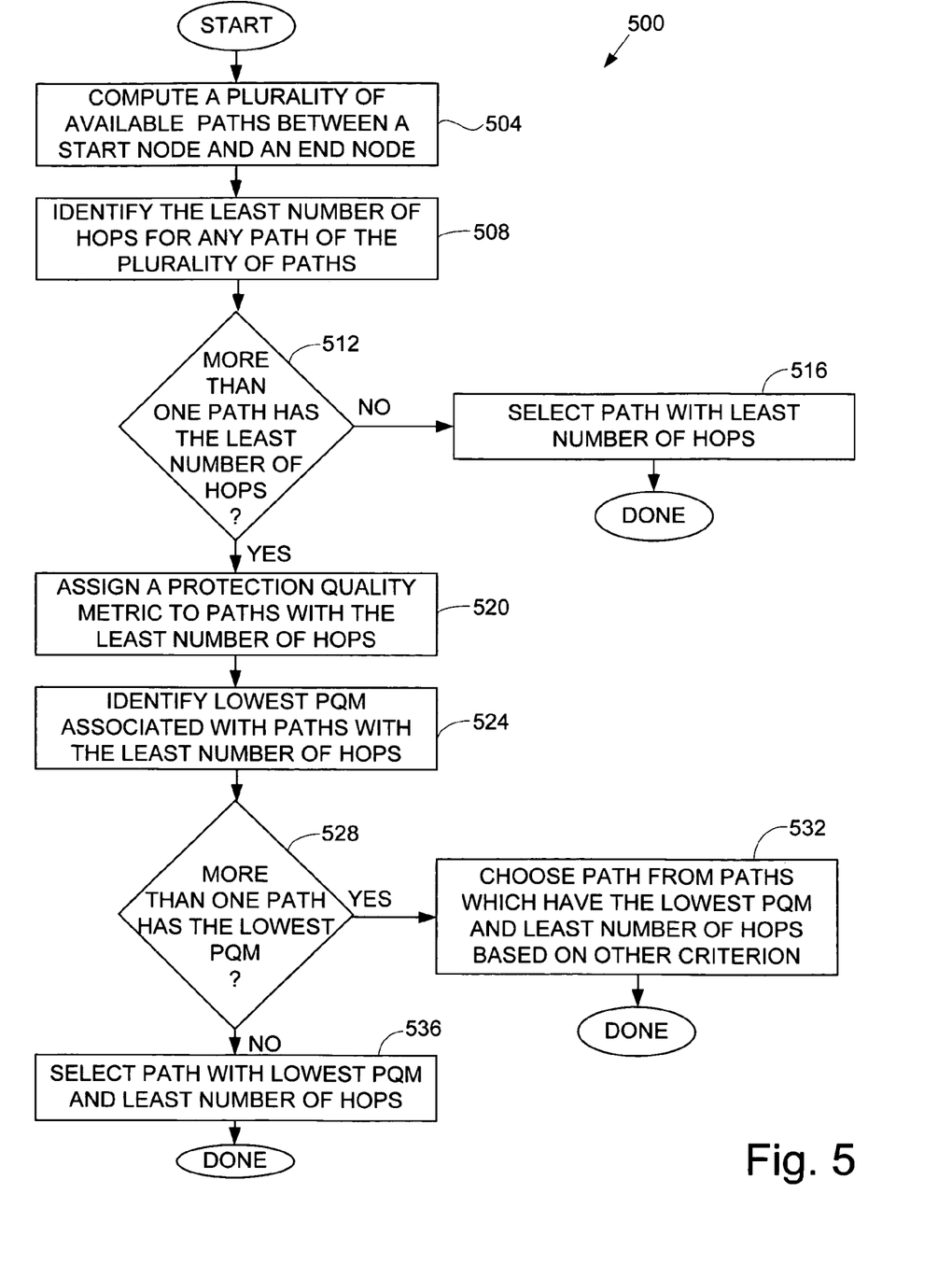
FIG. 5 is a process flow diagram which illustrates one method of determining a preferred path between a source and a destination which uses a shortest path criterion as a primary criterion and a protection quality metric as a secondary criterion in determining the preferred path in accordance with an embodiment of the present invention.

While a protection quality metric may often be used as a primary criterion in identifying a suitable circuit path between a source and a destination of a network, it should be appreciated that a protection quality metric may not necessarily be used as a primary criterion, e.g., a protection quality metric may be used as a secondary criterion. Referring next to FIG. 5, one method of determining a preferred path between a source and a destination which uses a shortest path criterion as a primary criterion and a protection quality metric as a secondary criterion in determining the preferred path will be described in accordance with an embodiment of the present invention. A process 500 of selecting a path, i.e., a best path, between a start node and an end node begins at step 504 in which a plurality of available paths between the start node and the end node are computed. After the plurality of available paths is computed using substantially any suitable path computation algorithm, the least number of hops for any path of the plurality of paths is identified in step 508.

Once the least number of hops for any path of the plurality of available paths is identified, it is determined in step 512 whether there is more than one path which has the least number of hops. In other words, it is determined in step 512 how many paths of the plurality of paths competed in step 504 may be considered to be the shortest path between the start node and the end node. If it is determined that no more than one path has the least number of hops, then that path is selected as the best path between the start node and the end node in step 516, and the process of selecting a circuit path is completed.

On the other hand, if it is determined in step 512 that more than one path has the least number of hops, then the indication is that an additional criterion is to be used in the determination of the most suitable path between the start node and the end node. In the described embodiment, the additional criterion is a protection quality metric. Hence, process flow moves from step 516 to step 520 in which each of the paths with the least number of hops is assigned a protection quality metric. That is, a protection quality metric for each path which has the least number of hops is determined for each path. Then, in step 524, the lowest protection quality metric associated with the paths which have the least number of hops is identified.

After the protection quality metric associated with the paths which have the least number of hops is assigned, it is determined in step 528 whether more than one of the paths with the least number of hops has a protection quality metric that is substantially equal to the lowest protection quality metric associated with the paths. If it is determined that substantially only one path is characterized by the lowest protection quality metric associated with the paths which have the least number of hops, then that path is selected as the preferred path between the start node and the end node in step 536, and the process of selecting a circuit path is completed.

Alternatively, if it is determined in step 528 that more than one path is characterized by both the lowest protection quality metric and the least number of hops, then the implication is that at least one additional criterion is to be used to choose a path between the start node and the end node. As such, in step 532, a path is selected from among the paths which have the lowest protection quality metric and the least number of hops based on an additional criterion, and the process of selecting a path between a start node and an end node is completed.

Figure 6:
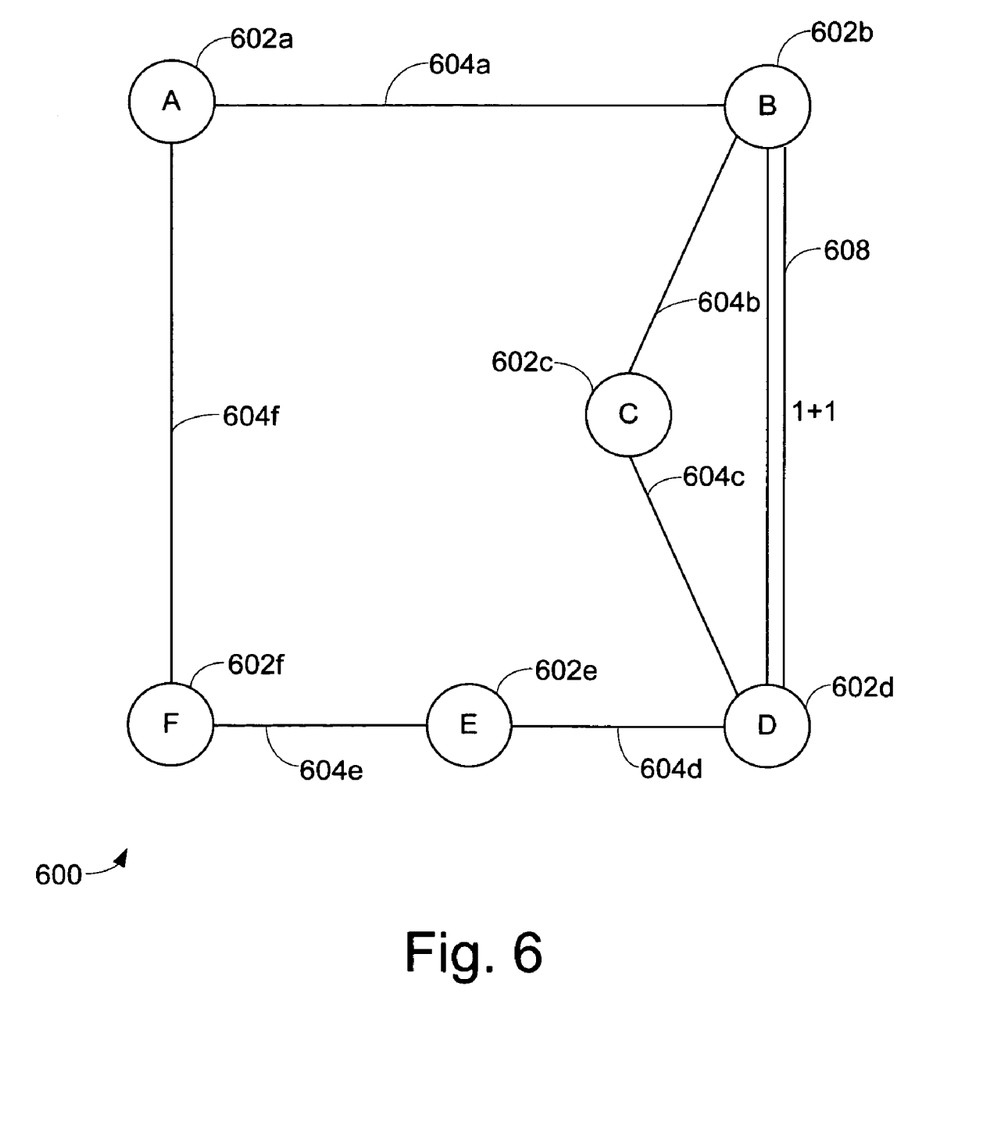
FIG. 6 is a diagrammatic representation of a network which includes a 2-fiber BLSR ring and 1+1 protected link in accordance with an embodiment of the present invention.

In addition to associating a cost with transitions between different BLSR rings, as discussed above with respect to FIGS. 3a-3c, a path computation algorithm generally also associated costs when other transitions are made. FIG. 6 is a diagrammatic representation of a network which includes a 2-fiber BLSR ring and 1+1 protected link in accordance with an embodiment of the present invention. A network 600 includes nodes 602 and links 604 which are part of a 2-fiber BLSR ring and a 1+1 link 608. When node 602a is a source or start node and node 602d is a destination or end node, there are effectively three possible routes or circuit paths from node 602a to node 602d. A first potential circuit path may include links 604a-c, a second potential circuit path may include links 604d-f, and a third potential circuit path may include link 604a and 1+1 link 608. In the described embodiment, an actual circuit path between node 602a and node 602d may be chosen using a primary criterion which is a protection quality metric. It should be appreciated, however, that a different primary criterion may instead be chosen, while the protection quality metric is used as a secondary criterion. By way of example, as specified by a service level agreement, a shortest path may be desired as the best path from node 602a to node 602b.

In the event that a shortest path, or a path with the least number of hops, is the primary criterion for use in identifying a chosen path, the third potential circuit path which includes link 604a and 1+1 link 608 may be determined to be the best path. The path which includes link 604a and 1+1 link 608 includes only two hops, whereas the other potential paths each include three hops. However, since the path which uses link 604a and 1+1 link 608 includes both part of a BLSR ring and a 1+1 link, node 602b is effectively a single point of failure. Hence, if node 602b were to fail, then a circuit from node 602a to node 602b is generally not recoverable.

If a low protection quality metric is specified, as for example by a service level agreement or a user, as a primary criterion to use in the selection of a circuit path from node 602a to node 602d, then the protection quality metric for each of the three available potential circuit paths is determined. The first potential circuit path which includes links 604a-c has a protection quality metric of zero, as there are no transitions between the 2-fiber BLSR ring and link 608 which has 1+1 protection. Hence, the first potential circuit path has zero points of failure. Similarly, the second potential circuit path which includes links 604d-f also has a protection quality metric of zero and zero points of failure. The third potential circuit path which includes link 604a and 1+1 link 608 has, as previously mentioned, a single point of failure. The third potential circuit path also has a protection quality metric of one.

As a lower protection quality metric is more desirable than a higher protection quality metric, the third potential circuit path is typically discarded from consideration as the best path between node 602a and node 602b when a low protection quality metric is the primary criterion in the selection of the best path. Since the first potential circuit path which includes links 602a-c and the second potential circuit path which includes links 602d-f have the same protection quality metric of zero, then a secondary criterion is employed to select one of the paths as the best path. In the embodiment as shown, both the first potential circuit path and the second potential circuit path have the same number of hops, so if a shortest path consideration is used as the secondary criterion, then a tertiary criterion may be needed in order to make the final selection between the first potential circuit path and the second potential circuit path.

Figure 7:
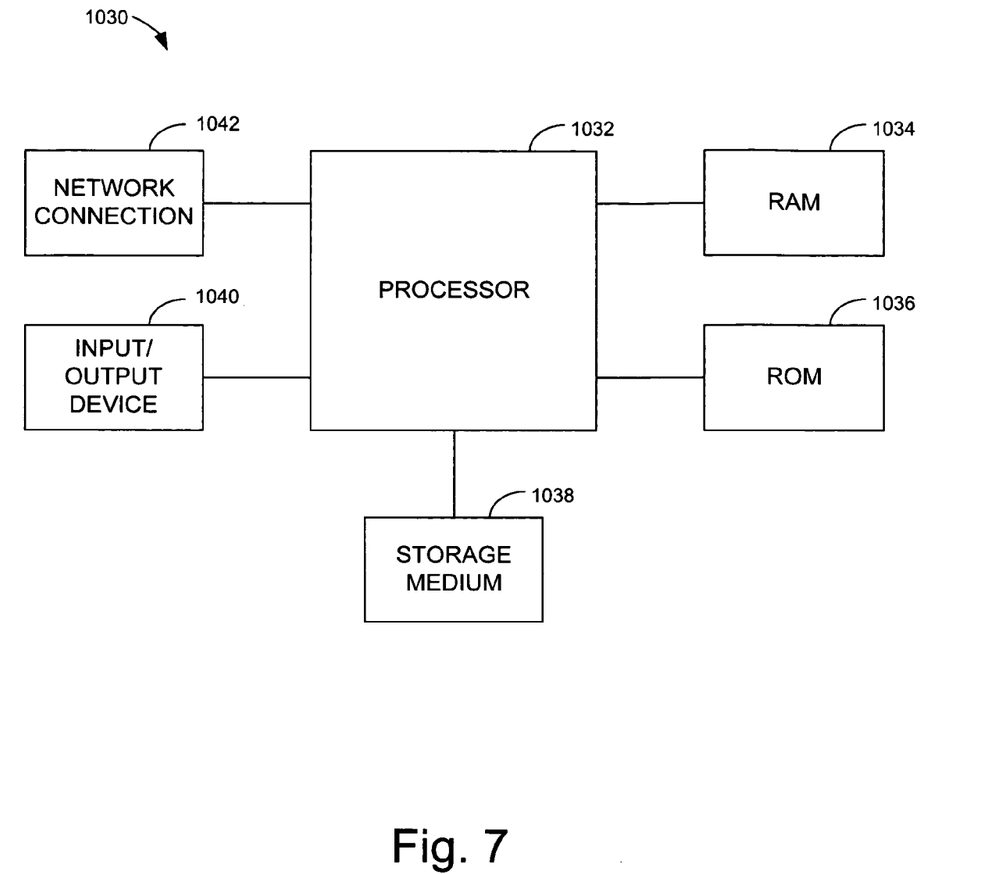
FIG. 7 illustrates a typical, general purpose computing device or computer system suitable for implementing the present invention.

A path computation algorithm which automatically contemplates a protection quality metric may be included as a part of a computing device which is either part of a network in which a path computed using the path computation algorithm or accessible to the network. FIG. 7 illustrates a typical, general purpose computing device or computer system suitable for implementing the present invention. A computer system 1030, which may be a node within a network or a component of a node within a network, includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. The above-described devices and materials will be familiar to those of skill in the computer hardware and software arts.

Figure 8A:
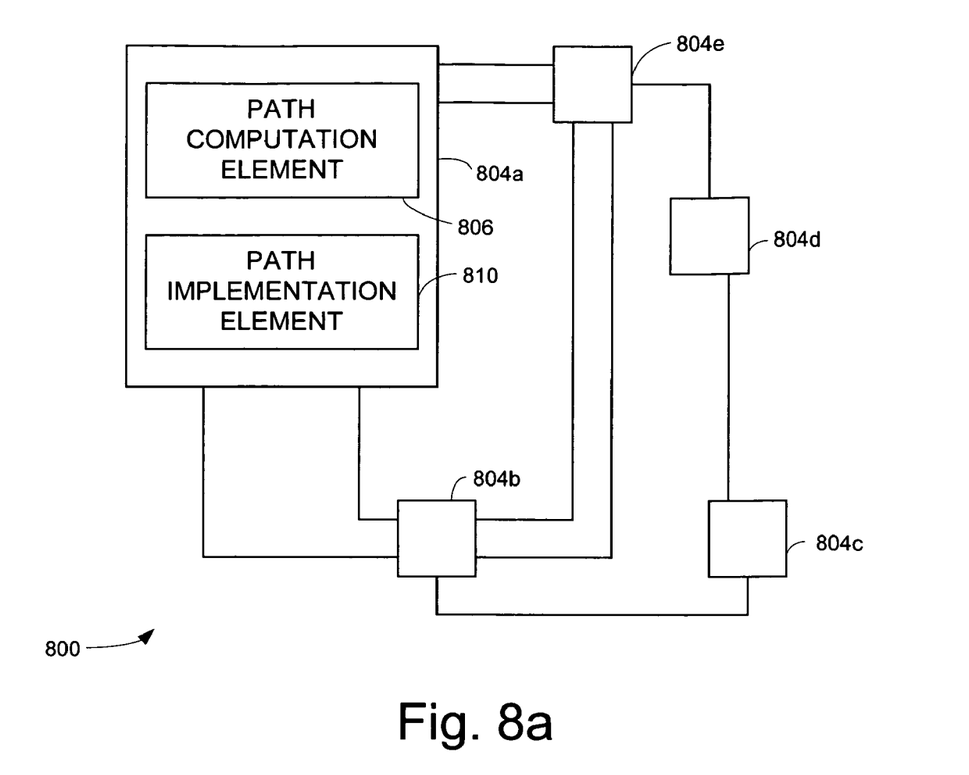
FIG. 8a is a diagrammatic representation of a device which is a part of a network and enables a circuit path within the network to be computed based on a protection quality metric in accordance with an embodiment of the present invention.

In general, a device which enables a circuit path to be selected based on a protection quality metric may include a path computation element and a path implementation element. That is, a device or system that is arranged to select a circuit path may include a portion which is arranged to compute and to select a path, and a portion that is arranged to actually create or implement the path. Such a device may be included as a part of the network, e.g., as a node within the network, in which a path is to be routed. As shown in FIG. 8a, a device 804a that is a node within a network 800 of nodes 804 includes a path computation element 806 that is arranged to select the best available circuit path between two selected nodes within network 800. Device 804a also includes a path implementation element 810 that is arranged to cause the path selected by path computation element 806 to be implemented within network 800.

Figure 8B:
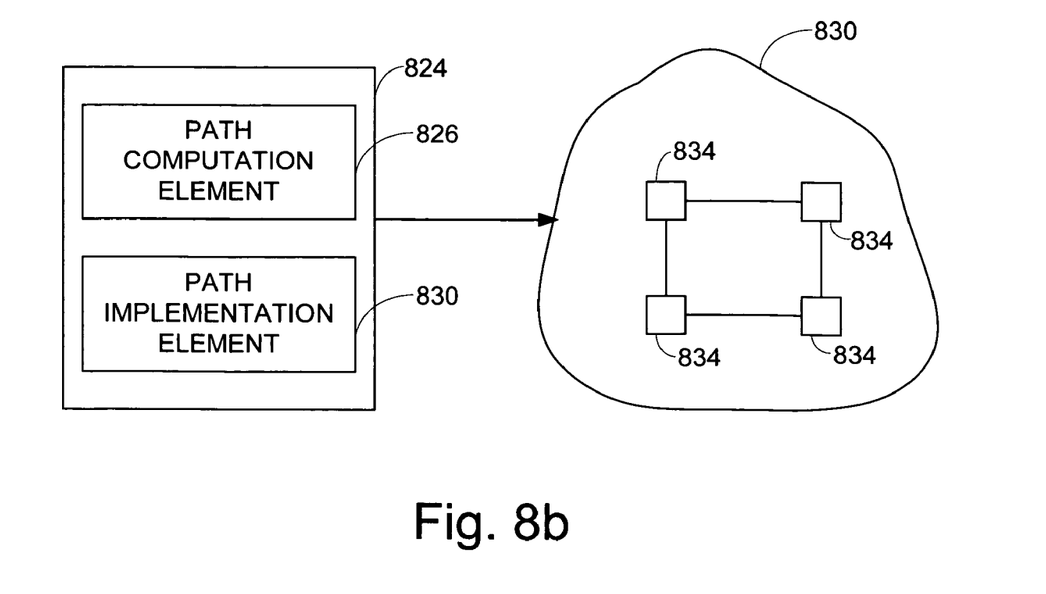
FIG. 8b is a diagrammatic representation of a device which interfaces with a network and enables a circuit path within the network to be computed based on a protection quality metric in accordance with an embodiment of the present invention.

In lieu of being included in a network within which a best path between two nodes is to be identified, a device which enables a circuit path to be selected based on a protection quality metric may instead be arranged to access the network, but may not be part of the network. That is, a device that enables a circuit path to be computed may have access to a network, but may not be a part of a node within the network. FIG. 8b is a diagrammatic representation of a device which interfaces with a network and enables a circuit path within the network to be computed based on a protection quality metric in accordance with an embodiment of the present invention. A device 824 which includes a path computation element 826 and a path implementation element 830 is arranged to interface with a network 830 to compute a path between at least some of nodes 834 based at least in part on a protection quality metric.

Although only a few embodiments of the present invention have been described, it should be understood that the present invention may be embodied in many other specific forms without departing from the spirit or the scope of the present invention. By way of example, the size of a network in which a protection quality metric is employed in a substantially automatic path computation process may vary widely. While relatively small networks have been described, networks which use a protection quality metric may be of substantially any size.

In general, a lower protection quality metric is assigned to a path which uses fewer different link types than is assigned to a path which uses more different link types. While a low protection quality metric has been described as being desirable over a high protection quality metric, it should be appreciated that in one embodiment, a protection quality metric may be arranged or configured such that a high protection quality metric is more desirable than a low protection quality metric. For instance, in lieu of assigning a protection quality metric of zero to a circuit path in which only a single link type is used, a relatively high protection quality metric may instead be assigned such that a path in which only a single link type is used has a higher protection quality metric than a path which includes more than one link type.

A user may interface with a path computation algorithm to select a primary criterion to use in the identification of a chosen path between a source and a destination. In some instances, however, a user may not be able to select a primary criterion and the primary criterion may instead be effectively "hard-coded" into the path computation algorithm without departing from the spirit or the scope of the present invention.

The steps associated with the various methods of the present invention may be altered, reordered, added, and removed without departing from the spirit or the scope of the present invention. For example, rather than using a shortest path or least number of hops criterion as a secondary criterion in the computation of a path when a protection quality metric is a primary criterion, various other criterion may be used as a secondary criterion.

In general, protection changes within a path may include transitions from a link of one protection type to a link of a second protection type. It should be appreciated that even when links have the same protection type, as for example when links are part of an inner ring of a 2-fiber BLSR ring and an outer ring of a 2-fiber BLSR ring, there may be a protection change. Such a protection change, which may result in the incrementing of a protection quality metric, occurs when a circuit path transitions from the inner ring to the outer ring of the 2-fiber BLSR. The point or node where such a transition is made is considered to be a potential single point of failure.

A device which enables a path computation algorithm to be executed has been described as either being included in a network within which a circuit path is to be determined, or being interfaced with a network within which a circuit path is to be determined. When the device is arranged to be interfaced with the network, such an interface may be across communications links or a manual link, e.g., the interface may take the form of a user who inputs information relating to the path selected using the device into the network.

While the use of a protection quality metric has been described as being suitable for use in a network which may include any of 2-fiber BLSR rings, 4-fiber BLSR rings, and links with 1+1 protection, it should be appreciated that a protection quality metric may generally be used in networks with substantially any types of links and rings. Therefore, the present examples are to be considered as illustrative and not restrictive, and the invention is not to be limited to the details given herein, but may be modified within the scope of the appended claims.

What is claimed is:

1. A method for routing circuit paths within a network, the circuit paths being arranged between a source and a destination of the network, the method comprising:

identifying a first available circuit path of the circuit paths between the source and the destination, the first available circuit path including a first plurality of links extending between nodes within said first available circuit path, wherein each of the first plurality of links has an associated protection type;

determining a number of protection changes associated with the first plurality of links, said protection change comprising a transition at one of said nodes, between two different protection types at two of said links connected to said node in said circuit path;

assigning a first metric to the first available path, the first metric being based on the number of protection changes associated with the first plurality of links; and identifying a selected available path of the circuit paths to be used to pass information between the source and the destination based at least in part on the first metric.

2. The method of claim 1 further including:

identifying a second available circuit path of the circuit paths between the source and the destination, the second available circuit path including a second plurality of links, wherein each of the second plurality of links has an associated protection type;

determining a number of protection changes associated with the second plurality of links; and assigning a second metric to the second available path, the second metric being based on the number of protection changes associated with the second plurality of links.

3. The method of claim 2 wherein the number of protection changes associated with the first plurality of links includes a number of transitions between different protection types associated with the first plurality of links and the number of protection changes associated with the second plurality of links includes a number of transitions between different protection types associated with the second plurality of links.

4. The method of claim 3 wherein identifying the selected available path of the circuit paths to be used to pass information between the source and the destination based at least in part on the first metric includes identifying the selected available path of the circuit paths to be used to pass information between the source and the destination based on the second metric.

5. The method of claim 4 wherein identifying the selected available path of the circuit paths to be used to pass information between the source and the destination based at least in part on the first metric further includes comparing the first metric and the second metric.

6. The method of claim 5 wherein comparing the first metric and the second metric includes determining which of the first available circuit path and the second available circuit path is the selected circuit path.

7. The method of claim 6 wherein when the first metric indicates that the number of protection changes associated with the first plurality of links is less than the number of protection changes associated with the second plurality of links, the first available circuit path is the selected circuit path.

8. The method of claim 6 wherein when comparing the first metric and the second metric indicates that the first metric and the second metric are approximately equal, the method further includes comparing the first plurality of links to the second plurality of links.

9. The method of claim 8 wherein when comparing the first plurality of links to the second plurality of links indicates that the first plurality of links is less than the second plurality of links, the first available circuit path is the selected circuit path.

10. The method of claim 3 wherein at least one link is common between the first plurality of links and the second plurality of links.

11. The method of claim 1 wherein the different protection types associated with the first plurality of links include any of a 2-fiber bi-directional line switched ring type, a 4-fiber bi-directional line switched ring type, a 1+1 protection type, and a uni-directional path switched ring type.

12. The method of claim 11 wherein when the different protection types associated with the first plurality of links includes the 2-fiber bi-directional line switched ring type, the number of protection changes associated with the first plurality of links includes a switch from a first ring of the 2-fiber bi-directional line switched ring type to a second ring of the 2-fiber bi-directional line switched ring type.

13. A computer-readable storage medium encoded with a computer program for routing circuit paths within a network, the circuit paths being arranged between a source and a destination of the network, the computer program comprising:

code devices that cause a first available circuit path of the circuit paths between the source and the destination to be identified, the first available circuit path including a first plurality of links extending between nodes within said first available circuit path, wherein each of the first plurality of links has an associated protection type;

code devices that cause a number of protection changes associated with the first plurality of links to be determined, said protection change comprising a transition at one of said nodes, between two different protection types at two of said links connected to said node in said circuit path;

code devices that cause a first metric to the assigned to first available path, the first metric being based on the number of protection changes associated with the first plurality of links; and code devices that cause a selected available path of the circuit paths to be identified to be used to pass information between the source and the destination based at least in part on the first metric.

14. The computer-readable storage medium of claim 13 further including:

code devices that cause a second available circuit path of the circuit paths between the source and the destination to be identified, the second available circuit path including a second plurality of links, wherein each of the second plurality of links has an associated protection type;

code devices that cause a number of protection changes associated with the second plurality of links to be determined; and code devices that cause a second metric to be assigned to the second available path, the second metric being based on the number of protection changes associated with the second plurality of links.

15. The computer-readable storage medium of claim 14 wherein the number of protection changes associated with the first plurality of links includes a number of transitions between different protection types associated with the first plurality of links and the number of protection changes associated with the second plurality of links includes a number of transitions between different protection types associated with the second plurality of links.

16. The computer-readable storage medium of claim 15 wherein the code devices that cause the selected available path of the circuit paths to be identified to be used to pass information between the source and the destination based at least in part on the first metric include code devices that cause the selected available path of the circuit paths to be identified be used to pass information between the source and the destination based on the second metric.

17. The computer-readable storage medium of claim 16 wherein the code devices that cause the selected available path of the circuit paths to be identified to be used to pass information between the source and the destination based at least in part on the first metric further include code devices that compare the first metric and the second metric.

18. The computer-readable storage medium of claim 17 wherein the code devices that compare the first metric and the second metric include code devices that determine which of the first available circuit path and the second available circuit path is the selected circuit path.

19. The computer-readable storage medium of claim 18 wherein when the first metric indicates that the number of protection changes associated with the first plurality of links is less than the number of protection changes associated with the second plurality of links, the first available circuit path is the selected circuit path.

20. The computer-readable storage medium of claim 18 wherein when the code devices that cause the first metric and the second metric to be compared indicate that the first metric and the second metric are approximately equal, the computer program product further includes code devices that cause the first plurality of links to be compared to the second plurality of links.

21. The computer-readable storage medium of claim 20 wherein when the code devices that cause the first plurality of links to be compared to the second plurality of links indicate that the first plurality of links is less than the second plurality of links, the first available circuit path is the selected circuit path.

22. A device, the device being arranged to route circuit paths within a network, the circuit paths being arranged between a source and a destination of the network, the device comprising:
means for identifying a first available circuit path of the circuit paths between the source and the destination, the first available circuit path including a first plurality of links extending between nodes within said first available circuit path, wherein each of the first plurality of links has an associated protection type;
means for determining a number of protection changes associated with the first plurality of links. said protection change comprising a transition at one of said nodes, between two different protection types at two of said links connected to said node in said circuit path;
means for assigning a first metric to the first available path, the first metric being based on the number of protection changes associated with the first plurality of links; and
means for identifying a selected available path of the circuit paths to be used to pass information between the source and the destination based at least in part on the first metric.

23. The device of claim 22 further including:
means for identifying a second available circuit path of the circuit paths between the source and the destination, the second available circuit path including a second plurality of links, wherein each of the second plurality of links has an associated protection type;
means for determining a number of protection changes associated with the second plurality of links; and
means for assigning a second metric to the second available path, the second metric being based on the number of protection changes associated with the second plurality of links.

24. The device of claim 23 wherein the number of protection changes associated with the first plurality of links includes a number of transitions between different protection types associated with the first plurality of links and the number of protection changes associated with the second plurality of links includes a number of transitions between different protection types associated with the second plurality of links.

25. The device of claim 24 wherein the means for identifying the selected available path of the circuit paths to be used to pass information between the source and the destination based at least in part on the first metric include means for identifying the selected available path of the circuit paths to be used to pass information between the source and the destination based on the second metric.

26. The device of claim 25 wherein the means for identifying the selected available path of the circuit paths to be used to pass information between the source and the destination based at least in part on the first metric further include means for comparing the first metric and the second metric, and the means for comparing the first metric and the second metric include means for determining which of the first available circuit path and the second available circuit path is the selected circuit path.

27. The device of claim 26 wherein when the first metric indicates that the number of transitions between the different protection types associated with the first plurality of links is less than the number of transitions between the different protection types associated with the second plurality of links, the first available circuit path is the selected circuit path.

28. The device of claim 22 wherein the different protection types associated with the first plurality of links include any of a 2-fiber bi-directional line switched ring type, a 4-fiber bi-directional line switched ring type, a 1+1 protection type, and a uni-directional path switched ring type.

29. The device of claim 28 wherein when the different protection types associated with the first plurality of links includes the 2-fiber bi-directional line switched ring type, the number of protection changes associated with the first plurality of links includes a switch from a first ring of the 2-fiber bi-directional line switched ring type to a second ring of the 2-fiber bi-directional line switched ring type.

30. A device, the device being arranged to route circuit paths within a network, the circuit paths being arranged between a source and a destination of the network, the device comprising:
a path computation element, the path computation element being arranged to identify a selected circuit path of a plurality of available circuit paths between the source and the destination, wherein the path computation element is arranged to determine a number of changes in protection schemes within each of the plurality of available circuit paths and to identify the selected circuit path as the one of the plurality of available circuit paths with a lowest number of changes in the protection schemes; and
a path implementation element, the path implementation element being arranged to implement the selected circuit path between the source and the destination;
wherein said protection change comprises a transition at a node within one of said circuit paths, between two different protection types at two links connected to said node and within said circuit path.

31. The device of claim 30 wherein the path computation element is further arranged to assign metrics to each of the plurality of available circuit paths which are indicative of the number of changes in the protection schemes within each of the plurality of available circuit paths.

32. The device of claim 31 wherein the path computation element is further arranged to compare the metrics of each of the plurality of available circuit paths to identify the selected circuit path, the selected circuit path having a lowest metric associated with the metrics of each of the plurality of circuit paths.

33. The device of claim 30 wherein the device is included in the network.

34. The device of claim 30 wherein the device is not included in the network.

35. A method for routing circuit paths within a network, the circuit paths being arranged between a source and a destination of the network, the method comprising:
identifying a plurality of available circuit paths between the source and the destination, the plurality of available circuit paths each being at least partially protected; identifying a first available path of the plurality of available paths which includes a lowest number of potential single points of failure of the plurality of available paths, wherein said lowest number of potential single points of failure is based at least in part on a number of protection changes associated with the available path; and
selecting the first available path of the plurality of available circuit paths for use in routing information between the source and the destination;
wherein said protection change comprises a transition at a node within one of said circuit paths, between two different protection types at two links connected to said node and within said circuit path.

36. The method of claim 35 wherein when the first available path passes through no nodes at which a protection type associated with the first available path changes, the first available path has no potential single points of failure.

37. The method of claim 35 further including:
assigning protection quality metrics to the plurality of available paths, wherein a first protection quality metric of the protection quality metrics is associated with the first available path of the plurality of available paths and identifies a number of potential single points of failure associated with the first available path, and a second protection quality metric of the plurality of protection quality metrics is associated with a second available path of the plurality of available paths and identifies a number of potential single points of failure associated with the second available path.

38. The method of claim 37 wherein identifying the first available path of the plurality of available paths includes determining when the first protection quality metric is a lowest of the protection quality metrics.

39. The method of claim 35 wherein each available path of the plurality of available circuit paths is a shortest path between the source and the destination.

40. The method of claim 35 wherein identifying a first available path of the plurality of available paths which includes a lowest number of potential single points of failure of the plurality of available paths includes identifying the first available path of the plurality of available paths which includes the lowest number of potential single points of failure of the plurality of available paths and is a shortest path between the source and the destination.

41. A computer-readable storage medium encoded with a computer program for routing circuit paths within a network, the circuit paths being arranged between a source and a destination of the network, the computer program comprising:
code devices that cause a plurality of available circuit paths between the source and the destination to be identified, the plurality of available circuit paths each being at least partially protected;
code devices that cause a first available path of the plurality of available paths which includes a lowest number of potential single points of failure of the plurality of available paths to be identified, wherein said lowest number of potential single points of failure is based at least in part on a number of protection changes associated with the available path; and
code devices that cause the first available path of the plurality of available circuit paths to be selected for use in routing information between the source and the destination;
wherein said protection change comprises a transition at a node within one of said circuit paths, between two different protection types at two links connected to said node and within said circuit path.

42. The computer-readable storage medium of claim 41 wherein when the first available path passes through no nodes at which a protection type associated with the first available path changes, the first available path has no potential single points of failure.

43. The computer-readable storage medium of claim 41 further including:
code devices that cause protection quality metrics to be assigned to the plurality of available paths, wherein a first protection quality metric of the protection quality metrics is associated with the first available path of the plurality of available paths and identifies a number of potential single points of failure associated with the first available path, and a second protection quality metric of the plurality of protection quality metrics is associated with a second available path of the plurality of available paths and identifies a number of potential single points of failure associated with the second available path.

44. The computer-readable storage medium of claim 41 wherein the code devices that cause the first available path of the plurality of available paths to be identified include code devices that cause a determination of when the first protection quality metric is a lowest of the protection quality metrics.

45. The computer-readable storage medium of claim 41 wherein each available path of the plurality of available circuit paths is a shortest path between the source and the destination.

46. The computer-readable storage medium of claim 41 wherein the code devices that cause a first available path of the plurality of available paths which includes a lowest number of potential single points of failure of the plurality of available paths to be identified include code devices that cause the first available path of the plurality of available paths which includes the lowest number of potential single points of failure of the plurality of available paths and is a shortest path between the source and the destination to be identified.

47. A system for routing circuit paths within a network, the circuit paths being arranged between a source and a destination of the network, the system comprising:
means for identifying a plurality of available circuit paths between the source and the destination, the plurality of available circuit paths each being at least partially protected;
means for identifying a first available path of the plurality of available paths which includes a lowest number of potential single points of failure of the plurality of available paths, wherein said lowest number of potential single points of failure is based at least in part on a number of protection changes associated with the available path; and
means for selecting the first available path of the plurality of available circuit paths for use in routing information between the source and the destination;
wherein said protection change comprises a transition at a node within one of said circuit paths, between two different protection types at two links connected to said node and within said circuit path.

48. The system of claim 47 wherein when the first available path passes through no nodes at which a protection type associated with the first available path changes, the first available path has no potential single points of failure.

49. The system of claim 47 further including:
means for assigning protection quality metrics to the plurality of available paths, wherein a first protection quality metric of the protection quality metrics is associated with the first available path of the plurality of available paths and identifies a number of potential single points of failure associated with the first available path, and a second protection quality metric of the plurality of protection quality metrics is associated with a second available path of the plurality of available paths and identifies a number of potential single points of failure associated with the second available path.

50. The system of claim 47 wherein the means for identifying the first available path of the plurality of available paths include means for determining when the first protection quality metric is a lowest of the protection quality metrics.

51. The system of claim 47 wherein each available path of the plurality of available circuit paths is a shortest path between the source and the destination.

52. The system of claim 47 wherein the means for identifying a first available path of the plurality of available paths which includes a lowest number of potential single points of failure of the plurality of available paths include means for identifying the first available path of the plurality of available paths which includes the lowest number of potential single points of failure of the plurality of available paths and is a shortest path between the source and the destination.

* * * * *

UNITED STATES PATENT AND TRADEMARK OFFICE
CERTIFICATE OF CORRECTION

| | |
|---|---|
| PATENT NO. | : 7,616,584 B2 |
| APPLICATION NO. | : 10/986675 |
| DATED | : November 10, 2009 |
| INVENTOR(S) | : Katukam et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1171 days.

Signed and Sealed this

Nineteenth Day of October, 2010

David J. Kappos
*Director of the United States Patent and Trademark Office*